US006710112B1

(12) United States Patent
Sandor et al.

(10) Patent No.: US 6,710,112 B1
(45) Date of Patent: Mar. 23, 2004

(54) AQUEOUS POLYMER DISPERSIONS

(75) Inventors: Mario Sandor, Worms (DE); Cheng-Le Zhao, Charlotte, NC (US); Harald Röckel, Neustadt (DE); Uwe Dittrich, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 81 days.

(21) Appl. No.: 09/702,724

(22) Filed: Nov. 1, 2000

(30) Foreign Application Priority Data

Nov. 12, 1999 (DE) .......................... 199 54 619

(51) Int. Cl.⁷ .......................... C08L 51/00; C08L 25/04
(52) U.S. Cl. .................. 524/458; 524/457; 524/504
(58) Field of Search ................ 524/457, 524, 524/504, 458; 525/301, 261, 308, 309, 221, 227, 228

(56) References Cited

U.S. PATENT DOCUMENTS

| | | | |
|---|---|---|---|
| 5,035,944 A | | 7/1991 | Frazza et al. |
| 5,182,327 A | | 1/1993 | Biale |
| 5,506,282 A | | 4/1996 | Min et al. |
| 5,643,993 A | * | 7/1997 | Guerin ................ 524/524 |
| 5,731,377 A | | 3/1998 | Friel |
| 5,804,676 A | * | 9/1998 | Hieda et al. |

FOREIGN PATENT DOCUMENTS

| | | |
|---|---|---|
| CA | 2182853 | 2/1997 |
| EP | 429 207 | 5/1991 |
| EP | 466 409 | 1/1992 |
| EP | 761 778 | 2/1997 |

* cited by examiner

Primary Examiner—Tae H. Yoon
(74) Attorney, Agent, or Firm—Oblon, Spivak, McClelland, Maier & Neustadt, P.C.

(57) ABSTRACT

An aqueous polymer dispersion having a minimum film-forming temperature of below +65° C. comprising at least one film-forming polymer in the form of dispersed polymer particles comprising a polymer phase P1 and a different polymer phase P2, the polymer dispersion being obtainable by free-radical aqueous emulsion polymerization comprising the following steps: i) polymerization of a first monomer charge M1 to give a polymer P1 having a theoretical glass transition temperature $T_g^{(1)}$ (according to Fox) and ii) polymerization of a second monomer charge M2 to give a polymer P2 having a theoretical glass transition temperature $T_g^{(2)}$ (according to Fox) which is different from $T_g^{(1)}$ in the aqueous dispersion of the polymer P1, at least one chain transfer reagent being used either in the polymerization of the monomer charge M1 or in the polymerization of the monomer charge M2; a process for preparing the aqueous polymer dispersion; and a pigmented and/or filled coating composition comprising as a binder the aqueous polymer dispersion.

25 Claims, No Drawings

AQUEOUS POLYMER DISPERSIONS

The present invention relates to aqueous polymer dispersions in which the polymer particles have two different polymer phases P1 and P2 having different theoretical glass transition temperatures $T_g^{(1)}$ and $T_g^{(2)}$.

The invention also relates to a process for preparing such polymer dispersions. The invention further relates to the use of the polymer dispersions as binders in coating compositions. The invention relates additionally to latex paints comprising such polymer dispersions as binders.

Paints are commonly divided into three categories in accordance with their ability to reflect light:

1. flat paints having a specular gloss of less than 15% reflectance,
2. semi-gloss paints having a specular gloss of about 35% to 50% reflectance, and
3. high-gloss paints having a specular gloss of >70% reflectance, based in each case on light having a 60° angle of incidence.

Solventborne paints can easily be formulated into these three categories. In the case of latex paints, i.e., paints comprising not only a pigment as coloring constituent but also an aqueous, film-forming polymer dispersion as binder, it is difficult to achieve a high specular gloss. The lower gloss of latex paints in comparison to oil-based paints has its origin in the process of film formation. In comparison to the polymer of the oil paints, which is dissolved at the molecular level, latex polymers are usually of higher molecular weight and are present in the form of individual particles. A retarded or greatly restricted flow of the macromolecules during the process of film formation is the result. This, and remanent textures, are the essential reasons why only a low gloss can usually be obtained with latex paints. In pigmented coating compositions based on aqueous polymer dispersions the quality of the coating depends essentially on the ability of the polymer particles, as the coating composition dries, to bind the pigment particles and any filler present and to form a coherent polymeric film. Of course, the higher the proportion of pigments and fillers in the coating composition, the more difficult this process is.

EP-A 429 207 describes aqueous polymer dispersions whose polymer particles have a core-shell structure, the core-forming polymers having a higher glass transition temperature than the polymers which form the shell. The polymer particles have a size in the range from 20 to 70 nm. The polymer dispersions described therein are used to prepare coating compositions with low levels of pigmentation having improved gloss and improved blocking resistance. A disadvantage is the low particle size, which leads to viscosity problems and stability problems during the preparation of the polymer dispersions.

U.S. Pat. No. 5,182,327 describes aqueous polymer dispersions and high-gloss latex paints prepared from them. The average molecular weight of the polymers present in the dispersions is below 150,000. Furthermore, the polymers are functionalized with from 3 to 20% by weight of an olefinic carboxylic acid. The paints exhibit poor blocking resistance, probably on account of the low molecular weight. Furthermore, in the wet state the coatings are sensitive to mechanical influences. Their scrub resistance (abrasion resistance), in particular, leaves something to be desired.

U.S. Pat. No. 5,506,282 describes aqueous coating compositions based on polymer dispersions which contain two different types of polymer particle having different particle diameters. EP-A 466 409 likewise describes a blend of two different aqueous polymer dispersions, in which one of the polymer particle types has a glass transition temperature above room temperature and the other polymer particle type has a glass transition temperature of below 20° C. EP-A 761 778 discloses similar coating compositions, the polymer particles in this case having not only a different glass transition temperature but also different particle sizes.

Coating compositions containing different types of polymer particle are, of course, more complex to prepare, since the different types of polymer particle must be prepared in separate polymerization reactions.

It is an object of the present invention to provide aqueous polymer dispersions which are easy to prepare and which in particular in coating compositions ensure high gloss, good mechanical strength and a high blocking resistance of the coating.

We have found that this object is achieved by means of aqueous polymer dispersions in which the polymer particles have a minimum film-forming temperature of below 65° C. and contain the two polymer phases P1 and P2 each with different glass transition temperatures $T_g^{(1)}$ and $T_g^{(2)}$, a chain transfer reagent having been used in the preparation of one of the polymer phases.

The present invention accordingly provides aqueous polymer dispersions having a minimum film-forming temperature of below +65° C. comprising at least one film-forming polymer in the form of dispersed polymer particles comprising a polymer phase P1 and a different polymer phase P2, the polymer dispersion being obtainable by free-radical aqueous emulsion polymerization comprising the following steps:

i) polymerization of a first monomer charge M1 to give a polymer P1 having a theoretical glass transition temperature $T_g^{(1)}$ (acccording to Fox) and
ii) polymerization of a second monomer charge M2 to give a polymer P2 having a theoretical glass transition temperature $T_g^{(2)}$ (according to Fox) which is different from $T_g^{(1)}$ in the aqueous dispersion of the polymer P1, at least one chain transfer reagent being used either in the polymerization of the monomer charge M1 or in the polymerization of the monomer charge M2.

In accordance with the invention, the polymer phases P1 and P2 have different glass transition temperatures $T_g^{(1)}$ and $T_g^{(2)}$. The difference between the glass transition temperatures is generally at least 10 K, preferably at least 20 K, in particular at least 40 K. With very particular preference, the difference between the theoretical glass transition temperatures is from 40 to 150 kelvins.

The term theoretical glass transition temperature as used here and below is the glass transition temperature $T_g^{(1)}$ or $T_g^{(2)}$, respectively, as calculated by the method of Fox on the basis of the monomer composition of the monomer charge M1 and of the monomer charge M2. According to Fox (T. G. Fox, Bull. Am. Phys. Soc. (Ser. II) 1, 123 [1956] and Ullmann's Enzyklopädie der technischen Chemie, Weinheim (1980), pp. 17, 18) the glass transition temperature of copolymers at high molecular masses is given in good approximation by $$\frac{1}{T_g} = \frac{X^1}{T_g^1} + \frac{X^2}{T_g^2} + \ldots \frac{X^n}{T_g^n}$$

where $x^1, X^2, \ldots, X^n$ are the mass fractions of the monomers 1, 2, ..., n and $T_g^1, T_g^2, \ldots, T_g^n$ are the glass transition temperatures of the polymers composed in each case of only one of the monomers 1, 2, ..., n in degrees Kelvin. These are known, for example, from Ullmann's Encyclopedia of Industrial Chemistry, VCH, Weinheim, Vol. A 21 (1992) p., 169 or from J. Brandrup, E. H. Immergut, Polymer Handbook 3$^{rd}$ ed, J. Wiley, New York 1989.

In accordance with the invention, the monomer charge M2 is preferably chosen such that the theoretical glass transition temperature (according to Fox) of the resulting polymer phase P2 lies above the theoretical glass transition temperature of the polymer P1 prepared first of all. The monomer charge M2 then preferably has a composition leading to a theoretical glass transition temperature $T_g^{(2)}$ of the polymer phase P2 which lies above 30° C., preferably above 40° C. and, in particular, in the range from 50° C. to 120° C.

For $T_g^{(2)}>T_g^{(1)}$, the monomer charge M1 preferably has a monomer composition leading to a theoretical glass transition temperature $T_g^{(1)}$ of the resulting polymer phase P1 which lies in the range from −40° to +40° C., preferably in the range from −30° C. to +30° C. and, with very particular preference, in the range from −10° C. to +25° C.

Where $T_g^{(1)}>T_g^{(2)}$, the preferred glass transition temperatures of the polymer phase P1 are subject to what was said above for P2 where $T_g^{(2)}>T_g^{(1)}$. The glass transition temperatures of the polymer phase P2 are then subject, accordingly, to what was said above for $T_g^{(1)}$.

In the polymer dispersions of the invention the weight ratio of the polymer phases to one another is in the range from 20:1 to 1:20, preferably from 9:1 to 1:9. In accordance with the invention, preference is given to polymer dispersions in which the fraction of polymer phase having the lower glass transition temperature is predominant. Where P1, as is preferred in accordance with the invention, has the lower glass transition temperature, the ratio P1:P2 is in particular in the range from 1:1 to 5:1 and, with particular preference, in the range from 2:1 to 4:1. The weight ratios of the polymer phases P1 and P2 in that case correspond approximately to the quantitative ratios of the monomer charges M1 and M2.

In the case of $T_g^{(1)}>T_g^{(2)}$, the quantitative ratios P1:P2 are in particular in the range from 1:1 to 1:5 and, with particular preference, in the range from. 1:2 to 1:4.

In accordance with the invention, the aqueous polymer dispersions preferably have minimum film-forming temperatures in the range below +65° C., in particular below 40° C. The minimum film-forming temperature is understood firstly to be the experimentally determinable temperature below which the aqueous polymer dispersion no longer forms a coherent film. The minimum film-forming temperature (MFT) can be determined experimentally down to an MFT of 0° C. At lower temperatures, the MFT can be estimated from the glass transition temperatures of the polymer phases P1 and P2, the MFT corresponding approximately to the glass transition temperature of the polymer phase having the lower glass transition temperature, provided this polymer phase predominates. The estimation of minimum film-forming temperatures on the basis of glass transition temperatures is familiar to the skilled worker. The MFT thus estimated of the polymer dispersions of the invention is in general above −35° C. Preferably, the minimum film-forming temperature is in the range from −20° C. to +40° C. and, in particular, from 0° C. to 40° C., in the case, for example, of binders for latex paints.

In accordance with the invention, at least one chain transfer agent (molecular weight regulator) is used during the polymerization of one of the two monomer charges, M1 or M2. The chain transfer agent lowers the molecular weight of the macromolecules which form during the polymerization of the respective monomer charges. Preferably, the weight-average molecular weight of the macromolecules prepared in the presence of the chain transfer agent is in the range from 20,000 to 200,000 and, in particular, in the range from 30,000 to 100,000 (determined by means of GPC). The weight-average molecular weight of the macromolecules not prepared in the presence of a chain transfer agent, on the other hand, is generally above 800,000 and, in particular, above 1,000,000.

Suitable chain transfer reagents are all chemical compounds having the ability under the conditions of a free-radical aqueous emulsion polymerization to terminate the chain growth reaction, e.g., by transferring hydrogen, while not completely inhibiting the polymerization. Examples of suitable chain transfer agents are aldehydes, such as acrolein and methacrolein, allyl alcohols, silanes, organic halogen compounds such as dichloromethane, dibromomethane, chloroform, bromoform, tetrabromomethane and carbon tetrachloride, aromatic compounds such as α-methylstyrene dimer, triphenylmethane, pentaphenylethane, phenols such as 2,6-di-tert-butylphenol and vinylphenol, benzyl vinyl ethers such as α-benzyloxystyrene, α-benzyloxyacrylonitrile and α-benzyloxyacrylamide, and organic sulfur compounds having at least one thiocarbonyl function or an SH function. Chain transfer reagents with SH function are preferred in accordance with the invention. Examples of suitable SH-functional compounds are mercaptoacetic acid, mercaptoethanol, thioglycolic acid, 2-ethylhexyl thioglycolate, especially aliphatic mercaptans of the formula R—S—H, where R is a linear or branched alkyl group having preferably 6 to 18 carbon atoms. Examples of suitable aliphatic mercaptans are n-hexyl mercaptan, n-octyl mercaptan, tert-octyl mercaptan, n-dodecyl mercaptan and n-stearyl mercaptan, especially tert-dodecyl mercaptan.

Examples of compounds having thiocarbonyl function are xanthogenates such as dimethylxanthogen disulfide and diethylxanthogen disulfide, and thiurams such as tetramethylthiuram disulfide, tetraethylthiuram disulfide and tetralmethylthiuram monosulfide.

In general, the chain transfer agent is used in an amount of from 0.1 to 10% by weight, preferably from 0.2 to 5% by weight and, in particular, from 0.3 to 4% by weight, based on the monomers to be polymerized in the respective monomer charge. The chain transfer agent is preferably used in the polymerization of the monomer charge M2, especially if it leads to a polymer phase P2 having a higher glass transition temperature than the polymer phase P1. Where the chain transfer agent is used in preparing the polymer phase having the higher glass transition temperature, i.e., preferably in the polymerization of M2, the amount of chain transfer agent is preferably from 0.2 to 5% by weight, in particular from 0.3 to 3% by weight, based on the overall weight of the monomer charge M2. Where the chain transfer agent is used in preparing the polymer phase P1 having the lower glass transition temperature, its amount is preferably from 0.1 to 4% by weight, in particular from 0.2 to 2.0% by weight, based on the overall weight of the monomer charge M1. The amount of chain transfer agent, based on the overall amount of the monomers M1 and M2, will preferably not exceed 2% by weight and in particular will not exceed 1% by weight.

In general, both the polymer phase P1 and the polymer phase P2 are composed essentially—i.e., to the extent of at least 80% by weight, preferably at least 90% by weight—of hydrophobic monomers having a water solubility of <60 g/l (at 25° C.). Examples of hydrophobic monomers are vinylaromatic monomers, such as styrene, α-methylstyrene, o-chlorostyrene or vinyltoluenes; vinyl esters of aliphatic $C_1$–$C_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl pivalate, vinyl laurate, vinyl stearate, and commercial monomers VEOVA® 5-11 (VEOVA® X is a trade name of Shell and stands for vinyl esters of α-branched aliphatic carboxylic acids having X carbon atoms, which are also called Versatic® X acids) and also esters of ethylenically unsaturated $C_3$–$C_8$ monocarboxylic or dicarboxylic acids with $C_1$–$C_{18}$, preferably $C_1$–$C_{12}$ and, in particular, $C_1$–$C_8$ alkanols or $C_5$–$C_8$ cycloalkanols. Examples of suitable $C_1$–$C_{18}$ alkanols are methanol, ethanol, n-propanol, i-propanol, 1-butanol, 2-butanol, isobutanol, tert-butanol, n-hexanol, 2-ethylhexanol, lauryl alcohol and stearyl alcohol. Examples of suitable cycloalkanols are cyclopentanol and cyclohexanol. Preferred hydrophobic monomers are, in particular, the esters of acrylic acid and also the esters of methacrylic acid with $C_1$–$C_{12}$ alkanols, such as methyl (meth)acrylate, ethyl (meth)acrylate, isopropyl (meth)acrylate, n-butyl (meth) acrylate, isobutyl (meth)acrylate, 1-hexyl (meth)acrylate, tert-butyl (meth)acrylate and 2-ethylhexyl (meth)acrylate. Also suitable are the esters of fumaric acid and of maleic acid, e.g., dimethyl fumarate, dimethyl maleate or di-n-butyl maleate. Furthermore, in addition to the abovementioned monomers, α,β-monoethylenically unsaturated nitriles such as acrylonitrile or methacrylonitrile are suitable hydrophobic monomers. It is also possible, moreover, to use $C_4$–$C_8$ conjugated dienes, such as 1,3-butadiene, isoprene or chloroprene, α-olefins, such as ethylene, propene and isobutene, and vinyl chloride or vinylidene chloride as hydrophobic comonomers.

In addition to the hydrophobic monomers, the polymer phases P1 and P2 generally also contain, in copolymerized form, functional monomers by means of which the properties of the aqueous polymer dispersions can be modified in a known manner. The modifying monomers firstly include monoethylenically unsaturated monomers having at least one acid group in the molecule, or salts of these monomers, examples being the alkali metal salts or the ammonium salts. Examples of monomers of this kind are monoethylenically unsaturated carboxylic acids having 3 to 8 carbon atoms and one or two acid groups in the molecule, e.g., acrylic acid, methacrylic acid, crotonic acid, vinylacetic acid and itaconic acid, and the monoesters of fumaric acid and of maleic acid with $C_1$–$C_4$ alkanols. The monoethylenically unsaturated monomers having at least one acid group further include monoethylenically unsaturated sulfonic acids, such as vinylsulfonic acid, allylsulfonic acid, methallylsulfonic acid, acryloyloxyethylsulfonic acid and 2-acrylamido-2-methylpropanesulfonic acid, and the sodium salts of said sulfonic acids. The monoethylenically unsaturated monomers having an acid group also include monoethylenically unsaturated phosphonic acids, such as vinyl-, allyl- and methallylphosphonic acid, 2-acryloyloxyethylphosphonic acid and 2-acrylamido-2-methylpropanesulfonic acid, and also the salts, especially the sodium salts, of said phosphonic acids.

Monoethylenically unsaturated monomers having at least one acid group are generally used in amounts <5% by weight, preferably <3% by weight, e.g., in an amount from 0.1 to <3% by weight and, in particular, in an amount of from 1 to 2.5% by weight, based on the overall weight of the monomer charges M1+M2 (and thus also based approximately on the overall weight of the polymer phases P1+P2). Preferably, both the polymer phase P1 and the polymer phase P2 contain in copolymerized form monoethylenically unsaturated monomers having an acid group. The polymer phase P2 preferably contains a larger proportion of such monomers, e.g., at least 1.5 times the amount and, in particular, twice the amount, based on the monomers copolymerized in the respective polymer phases.

In one preferred embodiment of the invention the polymer phases P1 and/or P2 contain in copolymerized form monomers containing urea groups, e.g., N-vinylurea and N-allylurea, and derivatives of imidazolidin-2-one, e.g., N-vinyl- and N-allylimidazolidin-2-one, N-vinyloxyethylimidazolidin-2-one, N-(2-(meth) acrylamidoethyl)imidazolidin-2-one, N-(2-(meth) acryloyloxyethyl)imidazolidin-2-one, N-[2-((meth) acryloyloxyacetamido)ethyl]imidazolidin-2-one etc. Monomers having urea groups are used preferably in amounts of from 0.1 to 10% by weight, in particular from 0.5 to 5% by weight, based on the overall weight of M1 and M2, in preparing the polymer dispersion of the invention. Monomers of this kind improve the wet adhesion of the coating compositions prepared from the polymer dispersions of the invention; that is, the adhesion of the coating in the damp or swollen state.

Furthermore, the polymer phases P1 and/or P2 mast contain in copolymerized form monoethylenically unsaturated, neutral or nonionic monomers whose homopolymers are of relatively high solubility in water or swellability in water. These monomers are copolymerized preferably in amounts of <5% by weight and more preferably <2% by weight, based on the overall weight of the polymer phases P1 and P2. Monomers of this type improve the stability of the polymer dispersions. Examples of such monomers are the amides, the N-alkylolamides or the hydroxyalkyl esters of the abovementioned carboxylic acids, such as acrylamide, methacrylamide, N-methylolacrylamide, N-methylolmethacrylamide, 2-hydroxyethylacrylamide, 2-hydroxyethylmethacrylamide, hydroxyethyl acrylate, hydroxyethyl methacrylate, hydroxypropyl acrylate and hydroxypropyl methacrylate.

It is also possible to use bifunctional monomers in preparing the polymers P1 and/or P2. These monomers are copolymerized, if desired, in minor amounts, generally from 0.1 to 5% by weight and, in particular, not more than 1% by weight, based on the overall monomer amount. They are preferably monomers having two nonconjugated, ethylenically unsaturated bonds, examples being the diesters of dihydric alcohols with α,β-monoethylenically unsaturated $C_3$–$C_8$ carboxylic acids, e.g., glycol bisacrylate, or esters of α,β-unsaturated carboxylic acids with alkenols, e.g., bicyclodecenyl (meth)acrylate. Preferred polymers include no copolymerized bifunctional monomers.

In general, the polymer phase having the higher theoretical glass transition temperature, i.e., preferably the polymer phase P2, contains at least 60% by weight, and in particular at least 80% by weight, in copolymerized form, of at least one hydrophobic monomer whose homopolymer has a glass transition temperature >30° C., preferably >50° C. Monomers of this kind include vinylaromatic monomers, especially styrene, and also $C_1$–$C_4$ alkyl esters of methacrylic acid, especially methyl methacrylate. Particular preference is given to the aforementioned $C_1$–$C_4$ alkyl esters of methacrylic acid. In one preferred embodiment of the polymer dispersions of the invention, therefore, the polymer phase P2 is composed to the extent of at least 60% by weight and, in particular, at least 80% by weight of the $C_1$–$C_4$ alkyl esters of methacrylic acid. Further suitable monomers for the polymer phase having the higher glass transition temperature, e.g., the polymer phase P2, are of course all other of the abovementioned monomers, examples being hydrophobic monomers whose homopolymers have a glass transition temperature >30° C., and also monoethylenically unsaturated monomers having an acid group and ethylenically unsaturated monomers having urea groups.

In one very particularly preferred embodiment of the present invention, the polymer phase having the higher glass transition temperature, i.e., preferably the polymer phase P2, contains the following monomers in copolymerized form:

from 60 to 99% by weight, in particular form 80 to 98.5% by weight, of at least one $C_1$–$C_4$ alkyl ester of methacrylic acid, especially methyl methacrylate, from 0.5 to 10% by weight, in particular from 0.5 to 5% by weight, of at least one of the abovementioned monoethylenically unsaturated monocarboxylic acids, especially acrylic acid or methacrylic acid, from 0.5 to 10% by weight, in particular from 1 to 7% by weight, of at least one monoethylenically unsaturated monomer having urea groups, and if desired up to 25% by weight of one or more $C_1$–$C_8$ alkyl acrylates.

The monomer phase having the lower theoretical glass transition temperature, i.e., preferably the polymer phase P1, is composed in general of at least 20% by weight and preferably at least 30% by weight, in particular from 30 to 80% by weight and, with particular preference, from 40 to 70% by weight, of at least one monoethylenically unsaturated, hydrophobic monomer whose homopolymer has a glass transition temperature of <20° C., in particular <0° C. Preferred monomers of this type are the $C_2$–$C_{12}$ alkyl esters of acrylic acid. In addition, the polymer phase having the lower theoretical glass transition temperature generally includes further copolymerized monomers different than the hydrophobic, monoethylenically unsaturated monomers having a corresponding glass transition temperature of <20° C. These include firstly the abovementioned monoethylenically unsaturated hydrophobic monomers having a corresponding glass transition temperature of more than 30° C., monoethylenically unsaturated monomers having at least one acid group, and, if desired, further, modifying monomers, e.g., monoethylenically unsaturated monomers having at least one urea group.

In one preferred embodiment the polymer phase having the lower glass transition temperature corresponds to the polymer phase P1. In this case, the monomer charge M1 contains with very particular preference the following monomers in the following amounts:

from 30 to 80% by weight, in particular from 40 to 70% by weight and, with very particular preference, from 50 to 65% by weight, of at least one $C_1$–$C_{10}$ alkyl ester of acrylic acid, from 20 to 60% by weight, in particular from 30 to 50% by weight, of at least one further monoethylenically unsaturated, hydrophobic monomer selected from the $C_1$–$C_4$ alkyl esters of methacrylic acid and from vinylaromatic monomers, especially methyl methacrylate and styrene, and from 0 to 20% by weight, in particular from 1 to 10% by weight, of one or more modifying monomers, in particular at least one monoethylenically unsaturated carboxylic acid in the aforementioned amounts and, if desired, a monomer having a urea group.

It has further proven advantageous if the polymer particles in the binder polymer dispersion have a weight-average polymer particle diameter in the range from 50 to 1000 nm (determined by means of an ultracentrifuge or by photon correlation spectroscopy; on particle size determination by means of ultracentrifuge see, e.g., W. Mächtle, Makromolekulare Chemie, 1984, Vol. 185, 1025–1039, W. Mächtle, Angew. Makromolekulare Chemie, 1988, 162, 35–42). In the case of binder dispersions having high solids contents—e.g., >50% by weight—based on the overall weight of the binder dispersion it is advantageous on viscosity grounds if the weight-average particle diameter of the polymer particles in the dispersion is $\geq 250$ nm. The average particle diameter will generally not exceed 1000 nm and preferably will not exceed 600 nm. For high-gloss paints it has proven advantageous if the polymer particle diameter is in the range from 50 to 250, in particular from 80 to 200 nm. The stated particle sizes relate to the $d_{50}$ values determined by means of light scattering on 0.01% by weight dispersions. The $d_{50}$ value is the diameter which 50% by weight of the polymer particles exceed and 50% by weight of the polymer particles fall below.

The aqueous polymer dispersions of the invention are prepared by free-radical aqueous emulsion polymerization of the monomer charges M1 and M2 in the presence of at least one free-radical polymerization initiator and, if desired, of a surface-active substance.

In this procedure, an aqueous polymer dispersion of the polymer P1 is first prepared by free-radical emulsion polymerization of the monomer charge M1 in an aqueous polymerization medium. An emulsion polymerization of the monomer charge M2 is then conducted in the resulting dispersion of the polymer P1. This forms an aqueous polymer dispersion whose polymer particles contain both a polymer phase P1 and a polymer phase P2. The aqueous polymerization medium generally contains less than 10% by weight of, preferably less than 5% by weight of, and in particular no, water-miscible organic solvents that do not participate in the polymerization.

Suitable free-radical polymerization initiators are all those capable of triggering a free-radical aqueous emulsion polymerization. They may include both peroxides, e.g., alkali metal peroxodisulfates, and azo compounds. As polymerization initiators it is common to use what are known as redox initiators, which are composed of at least one organic reducing agent and at least one peroxide and/or hydroperoxide, e.g., tert-butyl hydroperoxide with sulfur compounds, e.g., the sodium salt of hydroxymethanesulfinic acid, sodium sulfite, sodium disulfite, sodium thiosulfate or acetone bisulfite adduct, or hydrogen peroxide with ascorbic acid. Use is also made of combined systems containing a small amount of a metal compound which is soluble in the polymerization medium and whose metallic component is able to exist in a plurality of valence states, an example being ascorbic acid/iron(II) sulfate/hydrogen peroxide, where the ascorbic acid is frequently replaced by the sodium salt of hydroxymethanesulfinic acid, acetone bisulfite adduct, sodium sulfite, sodium hydrogen sulfite or sodium bisulfite and the hydrogen peroxide by organic peroxides such as tert-butyl hydroperoxide or alkali metal peroxodisulfates and/or ammonium peroxodisulfate. Likewise preferred initiators are peroxodisulfates, such as sodium peroxodisulfate. The amount of free-radical initiator systems :used, based on the overall amount of the monomers M1+M2 to be polymerized, is preferably from 0.1 to 2% by weight.

Surface-active substances suitable for conducting the emulsion polymerization are the emulsifiers and protective colloids that are normally employed for these purposes. The surface-active substances are usually used in amounts of up to 10% by weight, preferably from 0.5 to 5% by weight and, in particular, from 1.0 to 4% by weight, based on the overall amount of monomers M1+M2 to be polymerized.

Examples of suitable protective colloids are polyvinyl alcohols, starch derivatives and cellulose derivatives, and vinylpyrrolidone copolymers. An exhaustive description of further suitable protective colloids is given in Houben-Weyl, Methoden der organischen Chemie, Volume XIV/1, Makromolekulare Stoffe [Macromolecular Substances], Georg-Thieme-Verlag, Stuttgart 1961, pp. 411–420.

As surface-active substances it is preferred to use exclusively emulsifiers, whose relative molecular weights, unlike those of the protective colloids, are usually below 2000. They can be either anionic or nonionic in nature. The anionic emulsifiers include alkali metal salts and ammonium salts of alkyl sulfates (alkyl: $C_8$–$C_{12}$), of sulfuric monoesters with ethoxylated alkanols (EO units: 2 to 50, alkyl: $C_{12}$ to $C_{18}$) and with ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$), and also compounds of the formula I,

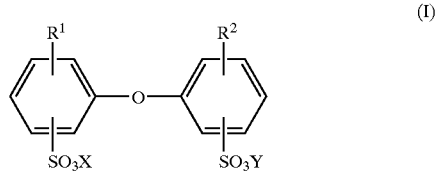

where $R^1$ and $R^2$ are hydrogen or $C_4$–$C_{24}$ alkyl, preferably $C_8$–$C_{16}$ alkyl, but are not both hydrogen simultaneously and X and Y can be alkali metal ions and/or ammonium ions. It is common to use technical-grade mixtures containing a fraction of from 50 to 90% by weight of the monoalkylated product, an example being Dowfax® 2A1 ($R^1$=$C_{12}$ alkyl; DOW CHEMICAL). The compounds I are common knowledge, for example from U.S. Pat. No. 4,269,749, and are available commercially.

Examples of suitable nonionic emulsifiers are ethoxylated mono-, di- and trialkylphenols (EO units: 3 to 50, alkyl: $C_4$–$C_9$), ethoxylates of long-chain alkanols (EO units: 3 to 50, alkyl: $C_8$–$C_{36}$), and polyethylene oxide/polypropylene oxide block copolymers. Preference is given to ethoxylates of long-chain alkanols (alkyl: $C_{10}$–$C_{22}$, average degree of ethoxylation: from 3 to 50) and, of these, particular preference to those based on naturally occurring alcohols or oxo alcohols with a linear or branched $C_{12}$–$C_{18}$ alkyl radical and a degree of ethoxylation of from 8 to 50. Anionic emulsifiers or combinations of at least one anionic and one nonionic emulsifier are preferred.

Further suitable emulsifiers can be found in Houben-Weyl, Methoden der organischen Chemie, Volume XIV/1, Makromolekulare Stoffe, Georg-Thieme-Verlag, Stuttgart, 1961, pp. 192–208.

The preparation of the polymer phase P1 can be carried out either as a batch process or in a semicontinuous procedure, the latter variant being preferred. In the case of semicontinuous procedures, the major amount, i.e., at least 70%, preferably at least 90%, of the monomers to be polymerized (in this case of the monomers M1 ) is supplied to the polymerization batch continuously, including by a stepped or gradient procedure, under polymerization conditions. This procedure is also known as the monomer feed technique. In this context it has proven advantageous to supply the monomers M1 in the form of an aqueous monomer emulsion. In parallel with the addition of the monomers M1, the polymerization initiator is fed in. One possible procedure is to include a small portion, i.e., preferably not more than 10% by weight, of the monomers M1 to be polymerized in the initial charge to the polymerization reactor and to heat this initial charge to polymerization temperature. At the same time a portion of the polymerization initiator, generally from 0.5 to 20% by weight, in particular about 10% by weight, is added to the still-cold initial charge, or to the initial charge during heating, or to the initial charge which is at polymerization temperature. Subsequently, the remaining amounts of initiator solution and the polymerization initiator at the rate at which it is consumed are added continuously to the polymerization reaction.

The monomer charge M2 is added subsequent to the monomer charge M1; it is even possible to commence the addition of M2 when at least 80%, preferably at least 90% and, in particular, about 95% of the monomer charge M1 have already been supplied to the polymerization reactor. In parallel with the addition of the monomer charge M2, polymerization initiator at the rate at which it is consumed is supplied to the polymerization reaction.

The addition of the chain transfer reagent can be made at the beginning of the addition of the respective monomer charge or, preferably, in parallel with the addition of the respective monomer charge. With particular preference, the chain transfer agent is dispersed in the respective monomer charge by, for example, being dissolved in the monomer phase.

In addition to the above-described seed-free preparation mode, the polymerization of the monomer phase M1 can also be conducted in the presence of a separately prepared seed latex. This procedure is preferred in accordance with the invention and results in effective control of polymer particle formation and thus in a more defined polymer particle size. In the case of the polymerization of the monomers M1 in the presence of a seed latex, preference will be given to operating in accordance with a feed technique where, in general, the seed latex is included in the cold initial charge and, during or after heating to polymerization temperature, a certain amount of the polymerization initiator, generally from 1 to 20%, in particular about 10%, is added, and then: the monomer charge M1 is supplied in the manner described above. The amount of seed latex used in each case depends of course on the desired particle size and is generally in the range from 0.01 to 10% by weight, based on the overall amount of the monomers M1+M2 to be polymerized. In the case of the preparation of the polymers preferred in accordance with the invention having polymer particle sizes in the range from 50 to 250 nm, it is common to use from 0.1 to 5% by weight, in particular from 0.2 to 3% by weight and, with very particular preference, from 0.5 to 2% by weight, based on the overall amount of the monomers M1 +M2 to be polymerized.

Suitable seed latices are known from the prior art (see e.g. EP-A 40419, EP-A 614 922, EP-A 567 812 and literature cited therein and also Encyclopedia of Polymer Science and Technology, Vol. 5, John Wiley and Sons Inc., New York 1966, p. 847). Normally a polystyrene seed will be used, since this is readily available and permits defined control of the polymer particle size.

In general, the polymer particles of the seed latex have an average particle size in the range from 10 to 200 nm; for the preparation of the finely particulate polymers preferred in accordance with the invention, having a particle size of <250 nm, preference is given to those seed latices in which the polymer particles have average particle diameters in the range from 20 to 80 nm. In principle, the composition of the seed latices is arbitrary. For reasons of more ready availability, a polystyrene seed will generally be used.

The pressure and temperature of polymerization are of minor importance. In general, polymerization is conducted at temperatures between room temperature and 120° C., preferably at temperatures of from 40 to 95° C., and, with particular preference, between 50 and 90° C.

Following the actual polymerization reaction, it may be necessary substantially to free the aqueous polymer dispersions of the invention from odorous substances, such as residual monomers and other volatile organic constituents. This can be done in a manner known per se physically, by distillative removal (especially by way of steam distillation) or by stripping with an inert gas. In addition, the residual monomer content can be lowered chemically by means of free-radical postpolymerization, in particular under the action of redox initiator systems as specified, for example, in DE-A 44 35 423. Preferably, the postpolymerization is conducted with a redox initiator system comprising at least one organic peroxide and an organic sulfite.

Preferably, before being used in the formulations of the invention, the dispersions of the copolymer P are adjusted to a pH in the range from 6 to 10, preferably by adding a nonvolatile base, e.g., alkali metal hydroxides or alkaline earth metal hydroxides, or nonvolatile amines.

By the emulsion polymerization route it is possible in principle to obtain dispersions having solids contents of up to about 80% by weight (polymer content, based on the overall weight of the dispersion). On practical grounds, polymer dispersions having solids contents in the range from 40 to 70% by weight are generally preferred for the formulations of the invention. Particular preference is given to dispersions having polymer contents of approximately 50% by weight. Of course, dispersions having lower solids contents are also suitable in principle for use for the formulations of the invention.

The aqueous polymer dispersions of the invention are stable liquid systems. They form films, and can therefore be used as binders for pigmented and/or filled coating compositions. Examples of pigmented coating compositions are sealants, sealing compounds, polymer-modified dispersion plasters, and paints also referred to as latex paints or emulsion paints. The aqueous polymer dispersions of the invention are particularly suitable as binders for high-gloss emulsion paints.

The aqueous polymer dispersions of the invention are used in the coating compositions in the amount required in each case.

To illustrate the abovementioned invention, the composition of a customary emulsion paint is elucidated below.

Emulsion paints contain generally from 30 to 75% by weight and preferably from 40 to 65% by weight of non-volatile constituents. Nonvolatiles are all constituents of the formulation other than water, but at least the overall amount of binder, filler, pigment, low-volatility solvents. (boiling point above 220° C.), e.g., plasticizers, and polymeric auxiliaries of this overall amount, approximately i) from 3 to 90% by weight, preferably from 10 to 60% by weight, is accounted for by solid binder constituents (=copolymer P)

ii) from 5 to 85% by weight, preferably from 10 to 50% by weight, by at least one inorganic pigment, iii) from 0 to 85% by weight, preferably from 5 to 60% by weight, by inorganic fillers, and iv) from 0.1 to 40% by weight, preferably from 0.5 to 20% by weight, by customary auxiliaries.

The polymer dispersions of the invention are suitable with particular preference for preparing high-gloss emulsion paints. These paints are generally characterized by a pigment volume concentration pvc in the range, from 15 to 30. The pigment volume concentration pvc here is 100 times the ratio of the total volume of pigments plus fillers divided by the total volume of pigments, fillers and binder polymers; cf. Ullmann's Enzyklopadie der technischen Chemie, $4^{th}$ edition, Volume 15, p. 667.

Examples of typical pigments ii) for the formulations of the invention, especially for emulsion paints, are titanium dioxide, preferably in the rutile form, barium sulfate, zinc oxide, zinc sulfide, basic lead carbonate, antimony trioxide, lithopones (zinc sulfide+barium sulfate). However, the formulations may also include colored pigments, examples being iron oxides, carbon black, graphite, luminescent pigments, zinc yellow, zinc green, ultramarine, manganese black, antimony black, manganese violet, Paris blue or Schweinfurt green. In addition to the inorganic pigments, the formulations of the invention may also include organic color pigments, e.g., sepia, gamboge, Cassel brown, toluidine red, para red, Hansa yellow, indigo, azo dyes, anthraquinonoid and indigoid dyes, and also dioxazine, quinacridone, phthalocyanine, isoindolinone and metal complex pigments.

Suitable fillers iii) include basically aluminosilicates, such as feldspars, silicates, such as kaolin, talc, mica, magnesite, alkaline earth metal carbonates., such as calcium carbonate, in the form, for example, of calcite or chalk, magnesium carbonate, dolomite, alkaline earth metal sulfates, such as calcium sulfate, silicon dioxide, etc. The fillers can be used as individual components. In practice, however, it is established in particular to use filler mixtures, e.g., calcium carbonate/kaolin and calcium carbonate/talc. Dispersion plasters may also include relatively coarse aggregates, such as sands or sandstone granules. In emulsion paints, of course, finely divided fillers are preferred.

In order to increase the hiding power and to save on the use of white pigments, it is common in the preferred emulsion paints to use finely divided fillers (extenders), e.g., finely divided calcium carbonate or mixtures of different calcium carbonates having different particle sizes. To adjust the hiding power, the shade and the depth of color it is preferred to use blends of color pigments and fillers.

The customary auxiliaries iv) include wetting agents or dispersants, such as sodium, potassium or ammonium polyphosphates, alkali metal salts and ammonium salts of polyacrylic acids and of polymaleic acid, polyphosphonates, such as sodium 1-hydroxyethane-1,1-diphosphonate, and also salts of naphthalenesulfonic acid, especially the sodium salts thereof. The dispersants are generally used in an amount of from 0.1 to 10% by weight based on the overall weight of the emulsion paint.

Furthermore, the auxiliaries iv) may also include thickeners, examples being cellulose derivatives, such as methylcellulose, hydroxyethylcellulose and carboxymethyl-cellulose; casein, gum arabic, tragacanth gum, starch, sodium alginate, polyvinyl alcohol, polyvinylpyrrolidone, sodium polyacrylates, water-soluble copolymers based on acrylic and methacrylic acid, such as acrylic acid-acrylamide and methacrylic acid-acrylate copolymers, and what are known as associative thickeners, such as styrene-maleic anhydride polymers, or preferably, hydrophobically modified polyether urethanes, as are described, for example, by N. Chen et al. in J. Coatings Techn. Vol 69, No. 867, 1997, p. 73 and by R. D. Hester et al. in J. Coatings Technology, Vol. 69, No. 864, 1997, p. 109, and the disclosure content of which is hereby incorporated fully into the present specification by reference.

The latex paints prepared with the polymer dispersion of the invention exhibit an improved wet abrasion (scrub)

resistance and an increased surface gloss relative to the prior art latex paints. Other important product properties, such as blocking resistance and viscosity of the paints, are not adversely affected.

EXAMPLES (1) Preparation and Characterization of the Polymer Dispersions

The average particle size ($d_{50}$ value) of the polymer particles was determined by dynamic light scattering (photon correlation spectroscopy) on a 0.01% by weight dispersion in water at 23° C. using an Autosizer IIc from Malvern Instruments, UK. The value stated is the cumulant z-average diameter of the measured autocorrelation function.

The minimum film-forming temperature (MFT) of the polymer dispersions was determined in accordance with Ullmanns Enzyklopädie der technischen Chemie, $4^{th}$ ed. Vol. 19, VCH Weinheim 1980, p. 17. The measuring instrument used was what is known as a film former bench (a metal plate to which a temperature gradient is applied and on which temperature sensors are mounted at various points for temperature calibration, the temperature gradient being chosen such that one end of the film former bench has a temperature above the expected MFT and the other end has a temperature below the expected MFT). The aqueous polymer dispersion is then applied to the film former bench. In those regions of the film former bench whose temperature is above the MFT, drying produces a clear film, whereas in the cooler regions a white powder is formed. The MFT is determined visually on the basis of the known temperature profile of the plate.

The water-insoluble latex polymer is prepared by means of emulsion polymerization, for which the conditions are specified below. The following abbreviations are used:

| S | styrene; |
|---|---|
| BA | n-butyl acrylate; |
| MMA | methyl methacrylate; |
| AA | acrylic acid; |
| UMA | 25% strength by weight solution of N-(2'-methacryloyloxyethyl)imidazolin-2-one in methyl methacrylate; |
| APS | ammonium persulfate; |
| tBHP | tert-butyl hydroperoxide; |
| E | 15% strength by weight aqueous solution of sodium dodecyl sulfate; |
| ABS | acetone bisulfite; |
| t-DMC | tert-dodecylmercaptan. |

Preparation Examples

Comparative Example 1: (without t-DMC)

In this comparative example a styrene-acrylate dispersion having a value for the minimum film-forming temperature of about 30° C. was used. The monomer compositions were chosen such that the theoretical glass transition temperature of the polymer phase 1 is 12° C. and that of the polymer phase 2 106° C.

A polymerization reactor was charged with 200 ml of water and 22.7 g of a polystyrene seed latex (33% by weight; average particle diameter $d_{50}$=30 nm) and this initial charge was heated to 85° C. Then 2 g of initiator solution were added in one portion. Commencing simultaneously, the remaining initiator solution was added over the course of 165 minutes and 95% of the monomer emulsion I were added over the course of 120 minutes to the polymerization reactor while maintaining the temperature. After 120 minutes, calculated from the beginning of the monomer addition, the monomer emulsion II was added to the remaining 5% of the monomer emulsion I and then the mixture thus obtained was added over the course of 45 minutes to the polymerization reactor. After the end of the additions of monomer and initiator, the 85° C. were maintained for a further 60 minutes and then the mixture was cooled to 70° C. and 2.6 g of 25% strength by weight aqueous ammonia were added. The mixture was subsequently cooled to room temperature and neutralized to a pH of 7.5 with 25% strength by weight aqueous ammonia solution, and 3.3 g of a biocide (Aktizid from Thor) were added. The resulting dispersion contained no coagulum and had a solids content of 49% and an average particle diameter of 136 nm, which was measured by means of photon correlation spectroscopy ($d_{50}$ value).

| Initiator solution | 1 g | of ammonium persulfate |
|---|---|---|
| | 19 g | of water |
| Monomer emulsion I | 145 g | of water |
| | 50 g | of E solution (15% in water) |
| | 3,75 g | of AA |
| | 145 g | of S |
| | 190 g | of BA |
| | 17.5 g | of MMA |
| | 19.5 g | of UMA (25% in MMA) |
| Monomer emulsion II | 56 g | of water |
| | 6.67 g | of E solution (15% in water) |
| | 3.75 g | of AA |
| | 101 g | of MMA |
| | 19.5 g | of UMA (25% in MMA) |

Example 1

The procedure of Comparative Example 1 was repeated except that in addition an amount of 1.25 g of t-DMC was added to the monomer emulsion I.

Example 2

The procedure of Example 1 was repeated, adding 2.5 g of t-DMC.

Example 3

The procedure of Example 1 was repeated, adding 3.75 g of t-DMC.

Example 4

The procedure of Example 1 was repeated, adding 5.0 g of t-DMC.

Examples 5 to 8

The preparation of the dispersions of these examples was analogous to that of Comparative Example 1 except that the following amounts of t-DMC were added to the monomer emulsion II:
Example 5: 1.25 g
Example 6: 5 g
Example 7: 2.5 9
Example 8: 3.75 g.

TABLE 1

| Example | MFT[1] [° C.] | $d_{50}$ [nm] | t-DMC[3] M1 [%] | t-DMC[3] M2 [%] |
|---|---|---|---|---|
| C1 | 30 | 136 | 0 | 0 |
| 1 | 29 | 133 | 0.25 | 0 |
| 2 | 24 | 133 | 0.5 | 0 |
| 3 | 24 | 129 | 0.75 | 0 |
| 4 | 24 | 131 | 1.0 | 0 |
| 5 | 24 | 130 | 0 | 0.25 |
| 6 | 26 | 129 | 0 | 0.5 |
| 7 | 24 | 131 | 0 | 0.75 |
| 8 | 24 | 131 | 0 | 1.0 |

[1] MFT = minimum film-forming temperature
[2] particle size, $d_{50}$ value (determined by means of light scattering on a 0.01% by weight dispersion)
[3] tert-dodecyl mercaptan in % by weight, based on the overall monomer amounts (2) Paint Formulation The multistage polymer dispersions were formulated to high-gloss paints in accordance with the following recipes:

| Constituent | Parts (g) |
|---|---|
| Propylene glycol | 29.0 |
| Biocide[1] | 1.6 |
| Pigment dispersant[2] | 33.5 |
| Ammonia (28%) | 0.8 |
| Coalescence aid[3] | 16.1 |
| Defoamer[4] | 4.0 |
| Thickener[5] | 28.2 |
| Pigment[6] | 239.6 |

Mix thoroughly and then add the following constituents:

| | |
|---|---|
| Dispersion (50%) | 437.6 |
| Coalescence aid[7] | 32.9 |
| Defoamer[4] | 2.4 |
| Thickener[5] | 16.8 |
| Water | 157.5 |
| | 1000.0 |
| pvc: | 22.8% |

Manufacturer details:
1) Kathon LX 1.5% strength by weight, in water, Rohm & Haas Company 100 Independence Mall West Philadelphia, Pa. 19106, USA
2) Tamol 681, BASF Aktiengesellschaft (Del.)
3 Methylcarbitol, Union Carbide Corporation Old Ridgebury Road Danbury, Conn. 06817, USA
4) Byk 022 BYK-Chemie USA
5) Acrysol RM2020, Rohm & Haas Company 100 Independence Mall West Philadelphia, Pa. 19106, USA
6) Ti-Pure® 700, E.I. du Pont Company 1007 Market Street Wilmington, Del. 19898, USA
7) Texanol, Eastman Chemical Products P.O. Box 431 Kingsport, Tenn. 37662, USA (3) Preparation of the Samples The emulsion paints prepared freshly in accordance with the procedure described above were first of all left to stand at room temperature for about 2 days. They were then filtered under vacuum through a 125 μm filter in order to remove air bubbles and larger pigment agglomerates. The filtered paints were used subsequently for further test investigations and coating applications.

(4) Viscosity at High and Low Shear Rate:

The viscosity of the paints at high shear rate was measured in accordance with ASTM D 4287. The viscosity of the paints at low shear rate was measured in accordance with ASTM D 562-81.

(5) Blocking Resistance:

The blocking resistance of the paints was measured in accordance with ASTM DM 4946, the substrates used being both sealed paper and Leneta sheets. The oven temperature was varied, as shown in Table 2.

The classifications were made in accordance with the following evaluation scale:

| Evaluation | Points |
|---|---|
| not tacky | 10 |
| barely tacky | 9 |
| very slight tack | 8 |
| slight to very slight tack | 7 |
| slight tack | 6 |
| moderate tack | 5 |
| very tacky, no tearing | 4 |
| 5–25% tearing | 3 |
| 25–50% tearing | 2 |
| 50–75% tearing | 1 |
| 75–100% tearing | 0 |

(6) Scrub Resistance

The scrub resistance of the coatings was determined in accordance with ASTM D 2486 using a Gardner scrub test apparatus and the standardized scrub medium SC-2. The paints were applied with the aid of an applicator to Leneta sheets, with a wet thickness of 175 μm. The coatings were then left to dry under standard climatic conditions (50% relative atmospheric humidity at 23° C.) for 14 days. The dry film thickness was then 36–39 μm. Subsequently, the scrub test was carried out. The result is reported as the number of scrub cycles (double strokes) until the coating was abraded right through.

(7) Gloss Measurements

The specular gloss of the coatings was determined in accordance with ASTM D 523-89. The paints were applied with the aid of an applicator to Leneta sheets made of transparent polyester, with a wet thickness of 75 μm. The coatings were left to dry under standard climatic conditions (50% relative atmospheric humidity, 23° C.) for about three days. Subsequently, the gloss measurement was carried out.

(8) Measurement of the Glass Transition Temperature ($T_g$)

The glass transition temperature is measured by the DSC technique (differential scanning calorimetry, 20° C./min, midpoint) in accordance with ASTM D 3418-82.

(9) Measurement of the Minimum Film-forming Temperature (MFT)

The minimum film-forming temperature (MFT) of the polymer dispersions was determined in accordance with Ullmanns Enzyklopädie der technischen Chemie, 4$^{th}$ ed. Vol. 19, VCH Weinheim 1980, p. 17. The measuring instrument used is what is known as a film former bench (a metal plate to which a temperature gradient is applied and on which temperature sensors are mounted at various points for temperature calibration, the temperature gradient being chosen such that one end of the film former bench has a temperature above the expected MFT and the other end has a temperature below the expected MFT).

The aqueous polymer dispersion is then applied to the film former bench. In those regions of the film former bench whose temperature is above the MFT, drying produces a clear film, whereas in the cooler regions cracks appear in the film and at even lower temperatures a white powder is formed. The MFT is determined visually on the basis of the known temperature profile of the plate.

(10) Results:

Table 2 below shows the results of the investigations reproduced above:

TABLE 2

| Dis-per-sion | Scrub resistance[1] [μm] | Gloss @20° | Gloss @60° | Blocking resistance[2] B1 | B2 | B3 | B4 | Viscosity LS[3] | Viscosity HS[4] |
|---|---|---|---|---|---|---|---|---|---|
| C1 | 830 | 39 | 60 | 85 | 8 | 8 | 8 | 7 | 86 | 1.6 |
| 1 | 880 | 37 | 69 | 88 | 8 | 8 | 7 | 7 | 88 | 1.6 |
| 2 | 1050 | 36 | 69 | 88 | 8 | 8 | 7 | 7 | 87 | 1.6 |
| 3 | 935 | 38 | 71 | 89 | 8 | 8 | 7 | 7 | 88 | 1.7 |
| 4 | 970 | 36 | 70 | 88 | 8 | 8 | 4 | 7 | 85 | 1.6 |
| 5 | 1360 | 37 | 64 | 87 | 8 | 8 | 7 | 7 | 88 | 1.6 |
| 6 | 1340 | 39 | 68 | 87 | 8 | 8 | 8 | 7 | 88 | 1.6 |
| 7 | 1180 | 38 | 67 | 86 | 7 | 8 | 3 | 3 | 88 | 1.6 |
| 8 | 1600 | 37 | 70 | 90 | 8 | 8 | 2 | 4 | 84 | 1.5 |

[1] Scrub resistance in scrub cycles; also indicated is the dry film thickness of the coating, in μm
[2] B1 = Leneta sheet, 30 min, 50° C., 1 kg
B2 = Leneta sheet, 24 h, room temperature, 1 kg
B3 = Sealing paper, 30 min, 50° C., 1 kg
B4 = Sealing paper, 24 h, room temperature, 1 kg
[3] Viscosity at low shear rate in Krebs units
[4] Viscosity at high shear rates, in poise From the examples it is evident that the polymer dispersions 1 to 8 of the invention result in paints having improved scrub resistance and enhanced gloss, while the blocking resistance and viscosity of the paints remain largely unaffected.

We claim:

1. An aqueous polymer dispersion having a minimum film-forming temperature of below +65° C. comprising at least one film-forming polymer in the form of dispersed polymer particles comprising a polymer phase P1 and a different polymer phase P2, the polymer dispersion obtained by free-radical aqueous emulsion polymerization comprising the following steps:
   i) polymerization of a first monomer charge M1 to give a polymer phase P1 having a theoretical glass transition temperature $T_g^{(1)}$ (according to Fox) and
   ii) polymerization of a second monomer charge M2 to give a polymer phase P2 having a theoretical glass transition temperature $T_g^{(2)}$ (according to Fox) which is at least 10 kelvins above $T_g^{(1)}$ in the aqueous dispersion of the polymer phase P1, at least one chain transfer reagent being used either in the polymerization of the monomer charge M1 or in the polymerization of the monomer charge M2, wherein the monomer charge M2 contains at least 80% by weight, based on the overall weight of the monomers contained in the monomer charge M2, of one or more $C_1$–$C_4$ alkyl methacrylates.

2. An aqueous polymer dispersion as claimed in claim 1, wherein the chain transfer reagent is selected from organic compounds having at least one SH group.

3. An aqueous polymer dispersion as claimed in claim 1, wherein the chain transfer reagent is used in an amount of from 0.1 to 5% by weight, based on the weight of the monomers contained in the respective monomer charge M1 or M2.

4. An aqueous polymer dispersion as claimed in claim 1, wherein the monomer charge M1 comprises:
   from 30 to 80% by weight of at least one monomer M1a selected from $C_1$–$C_{10}$ alkyl esters of acrylic acid,
   from 20 to 60% by weight of at least one further monomer M1b selected from the $C_1$–$C_4$ alkyl esters of methacrylic acid and from vinylaromatic monomers, and
   from 0 to 20% by weight of one or more ethylenically unsaturated monomers different from but polymerizable with the monomers M1a and M1b.

5. An aqueous polymer dispersion as claimed in claim 1, wherein the monomer charges M1 and M2 comprises in total from 0.1 to <3% by weight, based on the overall weight of the monomers contained in the monomer charges M1 and M2, of at least one monoethylenically unsaturated monomer having an acid group, or salt thereof.

6. An aqueous polymer dispersion as claimed in claim 1, wherein the weight ratio of the monomers present in the monomer charge M1 to the monomers present in the monomer charge M2 is in the range from 20:1 to 1:20.

7. A process for preparing an aqueous polymer dispersion as defined in claim 1 by free-radical aqueous emulsion polymerization comprising the following steps:
   i) polymerization of a first monomer charge M1 to give a polymer phase P1 having a theoretical glass transition temperature $T_g^{(1)}$ (according to Fox) and
   ii) polymerization of a second monomer charge M2 to give a polymer phase P2 having a theoretical glass transition temperature $T_g^{(2)}$ (according to Fox) which is at least 10 kelvins above $T_g^{(2)}$ in the aqueous dispersion of the polymer phase P1, at least one chain transfer reagent being used either in the polymerization of the monomer charge M1 or in the polymerization of the monomer charge M2, wherein the monomer charge M2 contains at least 80% by weight, based oil the overall weight of the monomers contained in the monomer charge M2, of one or more $C_1$–$C_4$ alkyl methacrylates.

8. A pigmented and/or filled coating composition comprising as binder at least one aqueous polymer dispersion as defined in claim 1.

9. A composition as claimed in claim 8, which is a latex paint.

10. An aqueous polymer dispersion as claimed in claim 1, wherein the polymer phase obtained in the presence of the chain transfer agent has a weight-average molecular weight in the range from 20,000 to 200,000, determined by GPC.

11. An aqueous polymer dispersion as claimed in claim 10, wherein the polymer phase obtained in the presence of the chain transfer agent has a weight-average molecular weight in the range from 30,000 to 100,000, determined by GPC.

12. An aqueous polymer dispersion as claimed in claim 1, wherein the polymer phase obtained in the absence of the chain transfer reagent has a weight-average molecular weight of above 800,000, determined by GPC.

13. An aqueous polymer dispersion as claimed in claim 12, wherein the polymer phase obtained in the absence of the chain transfer reagent has a weight-average molecular weight of above 1,000,000 determined by GPC.

14. An aqueous polymer dispersion as claimed in claim 10, wherein the polymer phase obtained in the absence of the chain transfer reagent has a weight-average molecular weight of above 800,000, determined by GPC.

15. An aqueous polymer dispersion as claimed in claim 11, wherein the polymer phase obtained in the absence of the chain transfer reagent has a weight-average molecular weight of above 1,000,000, determined by GPC.

16. An aqueous polymer dispersion as claimed in claim 1, wherein the weight ratio of the monomers present in the monomer charge M1 to the monomers present in the monomer charge M2 is in the range from 2:1 to 5:1.

17. The aqueous polymer dispersion as claimed in claim 1, wherein the chain transfer reagent is used in the polymerization of the monomer charge M1.

18. The aqueous polymer dispersion as claimed in claim 17, wherein the chain transfer reagent is used in an amount of from 0.2 to 2% by weight, based on the weight of the monomers contained in the monomer charge M1.

19. An aqueous polymer dispersion as claimed in claim 17, wherein the weight ratio of the monomers present in the monomer charge M1 to the monomers present in the monomer charge M2 is in the range from 2:1 to 5:1.

20. The process as claimed in claim 7, wherein the chain transfer reagent is used in the polymerization of the monomer charge M1.

21. The process as claimed in claim 20, wherein the chain transfer reagent is used in an amount of from 0.2 to 2% by weight, based on the weight of the monomers contained in the monomer charge M1.

22. The process as claimed in claim 7, wherein the monomer charge M1 comprises:

from 30 to 80% by weight of at least one monomer M1a selected from the $C_1$–$C_{10}$ alkyl esters of acrylic acid, from 20 to 60% by weight of at least one further monomer M1b selected from the $C_1$–$C_4$ alkyl esters of methacrylic acid and from vinylaromatic monomers, and from 0 to 20% by weight of one or more ethylenically unsaturated monomers different from but polymerizable with the monomers M1a and M1b.

23. The process as claimed in claim 7, wherein the monomer charges M1 and M2 comprise in total from 0.1<3% by weight, based on the overall weight of the monomers contained in the monomer charges M1 and M2, of at least one monoethylenically unsaturated monomer having an acid group, or salt thereof.

24. The process as claimed in claim 7, wherein the weight ratio of the monomers present in the monomer charge M1 to the monomers present in the monomer charge M2 is in the range from 2:1 to 5:1.

25. The process as claimed in claim 20, wherein the weight ratio of the monomers present in the monomer charge M1 to the monomers present in the monomer charge M2 is in the range from 2:1 to 5:1.

* * * * *